United States Patent
Wang

(10) Patent No.: US 8,739,560 B2
(45) Date of Patent: Jun. 3, 2014

(54) INTEGRATED COOLING, HEATING, AND POWER SYSTEMS

(75) Inventor: Ting Wang, Slidell, LA (US)

(73) Assignee: University of New Orleans Research and Technology Foundation, Inc., New Orleans, LA (US)

( * ) Notice: Subject to any disclaimer, the term of this patent is extended or adjusted under 35 U.S.C. 154(b) by 1164 days.

(21) Appl. No.: 12/529,695

(22) PCT Filed: Mar. 6, 2008

(86) PCT No.: PCT/US2008/055983
§ 371 (c)(1),
(2), (4) Date: Sep. 2, 2009

(87) PCT Pub. No.: WO2008/109718
PCT Pub. Date: Sep. 12, 2008

(65) Prior Publication Data
US 2010/0107593 A1     May 6, 2010

Related U.S. Application Data

(60) Provisional application No. 60/893,567, filed on Mar. 7, 2007.

(51) Int. Cl.
*F25B 15/00*     (2006.01)

(52) U.S. Cl.
USPC .............................................. 62/101; 62/476

(58) Field of Classification Search
CPC .............. F25B 15/00; F25B 1/00; F25B 7/00; F25B 35/00; F25B 37/00; F25B 17/00
USPC ................ 62/101, 56, 476, 79, 484, 497, 148; 60/39.83
See application file for complete search history.

(56) References Cited

U.S. PATENT DOCUMENTS

| 4,542,629 A | * | 9/1985 | Biermann | 62/476 |
| 4,732,008 A | * | 3/1988 | DeVault | 62/79 |

(Continued)

FOREIGN PATENT DOCUMENTS

| JP | 58099662 A | 6/1983 |
| JP | 07120098 A | 5/1995 |

(Continued)

OTHER PUBLICATIONS

Herold, Keith E., et al., "Absorption Chillers and Heat Pumps", © 1996, CRC Press, Inc., Boca Raton, Florida, p. 113-114; 145-155. (14 pages).

*Primary Examiner* — Mohammad M Ali
(74) *Attorney, Agent, or Firm* — McGlinchey Stafford; R. Andrew Patty, II

(57) ABSTRACT

One exemplary embodiment of this invention provides a single-effect absorption chiller including an absorber operatively connected to a solution heat exchanger and a generator, and a condenser in fluid communication with the absorber, wherein the absorber is sized and configured to receive a feed of water from a source of water and to transfer heat to the feed of water and then to convey the feed of water to the condenser without further heat conditioning of the feed of water prior to its entry into the condenser, and wherein the condenser is sized and configured to receive the feed of water from the absorber and to transfer heat to the feed of water, thereby cooling the condenser without resorting to an external heat exchanger such as a conventional cooling tower.

8 Claims, 3 Drawing Sheets

(56) References Cited

U.S. PATENT DOCUMENTS

| | | | |
|---|---|---|---|
| 4,827,728 A * | 5/1989 | DeVault et al. | 62/79 |
| 4,905,479 A * | 3/1990 | Wilkinson | 62/271 |
| 5,058,394 A * | 10/1991 | Wilkinson | 62/271 |
| 5,289,868 A * | 3/1994 | Koseki et al. | 165/219 |
| 5,477,696 A * | 12/1995 | Takahata et al. | 62/148 |
| 5,490,393 A * | 2/1996 | Fuesting et al. | 62/101 |
| 5,526,653 A * | 6/1996 | Cheng | 62/532 |
| 5,761,925 A * | 6/1998 | Maeda | 62/476 |
| 5,816,070 A * | 10/1998 | Meckler | 62/476 |
| 5,946,937 A * | 9/1999 | Kujak | 62/476 |
| 6,539,738 B2 * | 4/2003 | Gonzalez-Cruz et al. | 62/235.1 |
| 6,739,119 B2 * | 5/2004 | Erickson | 60/39.53 |
| 6,817,210 B1 * | 11/2004 | Kim et al. | 62/497 |
| 2003/0041608 A1 * | 3/2003 | Gonzalez-Cruz et al. | 62/235.1 |
| 2003/0121268 A1 | 7/2003 | Erickson | |
| 2007/0028769 A1 * | 2/2007 | Eplee et al. | 95/113 |

FOREIGN PATENT DOCUMENTS

| | | |
|---|---|---|
| JP | 08035735 A | 2/1996 |
| JP | 08054156 A | 2/1996 |
| JP | 09250834 A | 9/1997 |
| WO | WO 2008109718 A1 | 9/2008 |

* cited by examiner

INTEGRATED COOLING, HEATING, AND POWER SYSTEMS

REFERENCE TO RELATED APPLICATIONS

This is the National Stage of International Patent Application PCT/US2008/055983, filed on Mar. 6, 2008, which application claims priority from U.S. Application No. 60/893,567, filed Mar. 7, 2007, the disclosures of which are incorporated herein by reference.

TECHNICAL FIELD

This invention relates to the field of integrated cooling, heat, and power systems.

BACKGROUND

Various efforts have been made to provide combined cooling, heat, and power systems. However, the known systems all have their drawbacks. For example, in the range of distributed generation which is less than 200 kW, which is known in the art as "micro" or "microgeneration," the electric power generation efficiency is relatively low. Therefore, it is valuable to consider poly-generation, for example combined heating and power (CHP), as a practice for small power or heat needs.

Almost all of the current combined cooling, heating, and power (CCHP) applications have been designed and installed using existing commercial products. Typically they consist of a power generator, a heat recovery unit (HRU), a cooling system (an electrical compression system or an absorption chilling system), and a cooling tower. For residential or small business applications, the current practice is too complicated, bulky, expensive, and intimidating. Furthermore, the overall thermal/electric efficiency of existing micro-CCHP systems are generally below 70% and hover at 65% due to the small sizes of each component and the additional irreversibility generated between individual commercial units.

Thus, a need continues to exist for an integrated CCHP system which overcomes one or more of the aforementioned deficiencies of known systems.

SUMMARY OF THE INVENTION

This invention addresses this need by providing, amongst other things, a method of integrating a gas turbine, an absorption chiller, and a gas turbine inlet chiller into a compact module. This invention further provides a method for producing a large and constant electric power by using a gas turbine inlet cooling technology. Also, this invention provides a method of integrating the heat recovery unit into a generator of the absorption chiller system to eliminate the stand-alone heat recovery system, as well as a method of removing the cooling tower by incorporating the condenser cooling system in the absorber of the absorption chiller. This will significantly reduce the footprint and size of the CCHP system, increase the system performance, and make it easy to transport, install, and control.

In one embodiment of this invention there is provided a single-effect absorption chiller, comprising an absorber operatively connected to a solution heat exchanger and a generator, and a condenser in fluid communication with the absorber, wherein the absorber is sized and configured to receive a feed of water from a source of water and to transfer heat to the feed of water and then to convey the feed of water to the condenser without further heat conditioning of the feed of water prior to its entry into the condenser, and wherein the condenser is sized and configured to receive the feed of water from the absorber and to transfer heat to the feed of water, thereby cooling the condenser without resorting to an external heat exchanger such as a conventional cooling tower.

Yet another embodiment of this invention provides is a single-effect absorption chiller, comprising an absorber operatively connected to a solution heat exchanger and a generator, and a condenser operatively connected to a heat exchanger component of the generator, wherein the condenser is sized and configured to receive a feed of water from a source of water and to transfer heat to the feed of water and then to convey the feed of water to the heat exchanger component of the generator and to transfer heat to the feed of water from an external heat source to provide hot water without resorting to an external heat recovery unit.

Still another embodiment of this invention is a method comprising providing a refrigerant vapor to an absorber of a single-effect absorption chiller in which at least the refrigerant vapor contacts an incoming condensed absorbent stream from a solution heat exchanger, the refrigerant vapor is absorbed by the condensed absorbent stream to form a liquid diluted solution mixture, and a water stream from a source of water is provided to cool the absorber to make a high affinity between the refrigerant vapor and the condensed absorbent stream during the absorption process and to transfer heat to the feed of water; providing the water stream from the absorber to a condenser so that the water stream absorbs at least a portion of released latent heat from the condenser, thereby forming a condenser-heated water stream and cooling the condenser without resorting to an external heat exchanger such as a conventional cooling tower; further heating the condenser-heated water stream by feeding it into a generator through a heat exchanger component wherein the condenser-heated water stream absorbs additional heat from energy from an external heat source to provide hot water without resorting to an external heat recovery unit; providing a second water stream into an evaporator in which a low-temperature, low-pressure refrigerant flashes into a vapor and absorbs heat from the second water stream, thereby lowering the temperature of the second water stream and forming a chilled water stream; transferring at least a portion of the chilled water stream to an engine inlet chiller operatively connected to a combustion engine; and circulating exterior air through the engine inlet chiller.

In another embodiment of this invention, a multiple-effect absorption chiller system is provided. The system comprises an absorber operatively connected to a solution heat exchanger and a generator, and an initial condenser in fluid communication with the absorber, wherein the absorber is sized and configured to receive a feed of water from a source of water and to transfer heat to the feed of water and then to convey the feed of water to the initial condenser without further heat conditioning of the feed of water prior to its entry into the initial condenser, and wherein the initial condenser is sized and configured to receive the feed of water from the absorber and to transfer heat to the feed of water, thereby cooling the initial condenser without resorting to an external heat exchanger such as a conventional cooling tower.

Still another embodiment of this invention is a multiple-effect absorption chiller system, comprising an absorber operatively connected to a solution heat exchanger and a generator, and a condenser operatively connected to a heat exchanger component of a terminal generator, wherein the condenser is sized and configured to receive a feed of water from a source of water that has not been intentionally heat conditioned and to transfer heat to the feed of water and then to convey the feed of water to the heat exchanger component of the generator, the heat exchanger component of the generator being sized and configured to receive the feed of water and to transfer heat to the feed of water from an external heat source without resorting to an external heat recovery unit.

In yet another embodiment of the invention, a method is provided which comprises providing a refrigerant vapor to an absorber in a multiple-effect absorption chiller in which at least the refrigerant vapor contacts an incoming condensed absorbent stream from a solution heat exchanger, the refrigerant vapor is absorbed by the condensed absorbent stream to form a liquid diluted solution mixture, and a water stream from a source of water is provided to cool the absorber to make a high affinity between the refrigerant vapor and the condensed absorbent stream during the absorption process and to transfer heat to the feed of water; providing the water stream from the absorber to an initial condenser so that the water stream absorbs at least a portion of released latent heat from the initial condenser, thereby forming an initial-condenser-heated water stream and cooling the initial condenser without resorting to an external heat exchanger such as a conventional cooling tower; further heating the initial-condenser-heated water stream by feeding it into a terminal generator through a heat exchanger component wherein the initial-condenser-heated water stream absorbs additional heat from energy from an external heat source to provide hot water without resorting to an external heat recovery unit; providing a second water stream into an evaporator in which a low-temperature, low-pressure refrigerant flashes into vapor and absorbs heat from the second water stream, thereby lowering the temperature of the second water stream and forming a chilled water stream; transferring at least a portion of the chilled water stream to an engine inlet chiller operatively connected to a combustion engine; and circulating exterior air through the engine inlet chiller.

A system provided in yet another embodiment of this invention comprises a combustion engine, a single-effect absorption chiller in accordance with the teachings herein, an engine inlet chiller operatively connected to at least the combustion engine, and a conduit for conveying chilled water from the absorption chiller to the engine inlet chiller, the foregoing being sized and configured so that, during use, waste heat released from the combustion engine powers the generator of the single-effect absorption chiller. The single-effect absorption chiller provides space cooling as well as produces chilled water, and the system is sized and configured to circulate at least a portion of the chilled water through the conduit back to the engine inlet chiller to cool air entering the combustion engine.

Another embodiment of this invention is a system comprising: a combustion engine, a multiple-effect absorption chiller in accordance with the teachings herein, an engine inlet chiller operatively connected to at least the combustion engine, and a conduit for conveying chilled water from the absorption chiller to the engine inlet chiller, the foregoing being sized and configured so that, during use, waste heat released from the combustion engine powers at least one internal generator of the multiple-effect absorption chiller. The multiple-effect absorption chiller provides space cooling as well as produces chilled water, and the system being sized and configured to circulate at least a portion of the chilled water through the conduit to the engine inlet chiller to cool air entering the combustion engine.

These and other embodiments, features and benefits of this invention will be still further apparent from the ensuing description, accompanying figures and appended claims.

BRIEF DESCRIPTION OF THE DRAWINGS

Like reference numbers or letters employed within the various figures refer to like parts or components.

FURTHER DETAILED DESCRIPTION OF THE INVENTION

Gas turbine inlet cooling is extremely effective in counteracting the decreasing micro-gas turbine performance during the hot and humid summer when the power demand reaches maximum levels. Employing gas turbine inlet cooling minimizes the effect of ambient temperature and moisture on the electricity output of the gas turbine because gas turbine output is a strong function of ambient temperature and typically loses between 0.3% and 0.5% of their ISO rated power for every 1° F. rise in inlet temperature. In the engine size considered (nominal 28 kW), a typical micro-gas turbine engine, without using a recuperator (such as the Capstone model 330), is evaluated with a conversion efficiency rated at approximately 23% (HHV) of fuel input (full load ratings with no system loads or duration applied). Unfortunately, similar to the engine power output, its efficiency is also affected by ambient conditions, and efficiency drops to about 19% (HHV) at 86° F. This roughly equates to an effective heat rate of about 17,963 Btu/kWh.

To compensate for the degradation of efficiency and power output, a number of Turbine Inlet Cooling (TIC) technologies can be employed to increase the mass-flow through the combustion turbine by cooling the inlet air. Cooler air is denser, and since combustion turbines are constant volume flow machines, denser air equates to greater mass flow. Options to improve micro-gas turbine performance through inlet cooling are numerous, including both indirect evaporative "pre-cooling" systems, active "chiller" refrigeration based systems (both electrically driven and thermally driven), desiccant cooling systems, and a number of water spray/fogging options. However, these methods known in the art have known drawbacks. Particularly, in regions where summers are hot and humid, evaporative cooling and fogging method are not effective to bring down the temperature. In order to combat such problems, the first embodiment of the present invention, depicted in FIG. 1, employs at least a portion of the chilled water from either a single-effect or multiple-effect absorption chiller to cool the inlet air of the gas turbine. Also, in this first embodiment of the present invention, the single-effect or multiple-effect absorption chiller may employ any combination of refrigerant/absorbent solutions. Preferred refrigerant/absorbent solutions are water/lithium bromide and ammonia/water, with water/lithium bromide solution being most preferred. Particularly, lithium bromide is most desirable for cooling above the freezing point.

Figure 1:
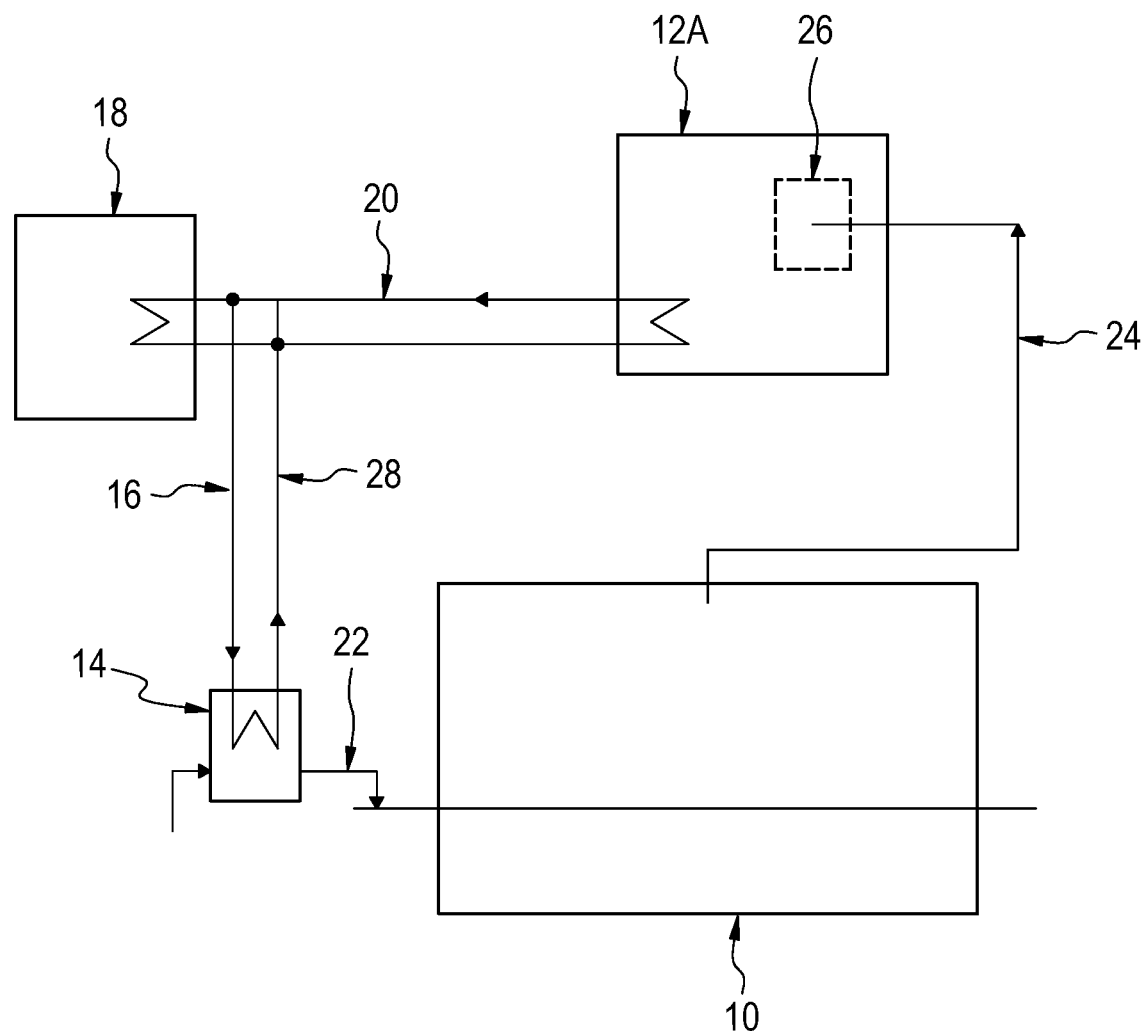
FIG. 1 is a diagram of a combined cooling, heat and power system with inlet cooling and an integrated heat recovery unit inside the single-effect absorption chiller system. In this embodiment of the invention, the cooling tower and the stand-alone HRU are removed.

As demonstrated in certain embodiments of the present invention, a single-effect or multiple-effect absorption chiller is a better candidate to provide inlet air cooling than existing technologies, especially when the requirement for hot water diminishes in summer months. Also, during the summer, excess heat can be effectively utilized as an energy source for the single-effect or multiple-effect absorption chiller. Therefore, as shown in FIG. 1, a first embodiment of this invention integrates an absorption chiller system with the micro-gas turbine to provide turbine inlet air-cooling, boost fuel-electricity efficiency, and power output in summer.

A single-effect or multiple-effect absorption chiller employed as part of the system of the first embodiment of this invention provides space cooling as well as cooling for the turbine inlet air. Cooling of the turbine inlet air in this manner allows the air to be cooled down to at least the ISO condition (59° F. and 60% relative humidity) during the hot days. By employing the first embodiment of the present invention by using turbine inlet air cooling with a micro-gas turbine engine to cool the inlet air to at least the ISO condition, the electric power output can be enhanced by up to approximately 17%, and possibly more in certain cases, on 85° F. days. By providing at least a portion of the chilled water from the outlet of the absorption chiller to further cool the inlet air of the micro-gas turbine to 42° F., the electric power output can be enhanced by up to approximately 27%, and possibly more in certain cases, on 85° F. days also by employing the first embodiment of the present invention. Thus, in some embodiments, by providing at least a portion of the chilled water from the outlet of the absorption chiller to cool the inlet air of the micro-gas turbine, the electric power output enhancement is in the range of about 5% to about 27%, while in other embodiments the enhancement may be in the range of about 10% to about 27%, by employing the first embodiment of the present invention on 85° F. days. By providing at least a portion of the chilled water from the outlet of the absorption chiller to cool the inlet air of the micro-gas turbine from 95° F. to at least the ISO condition (59° F.), the electric power output can be enhanced by up to approximately 20%, and possibly more in certain cases, on 95° F. days also by employing the first embodiment of the present invention. By providing at least a portion of the chilled water from the outlet of the absorption chiller to further cool the inlet air of the micro-gas turbine to 42° F., the electric power output can be enhanced by up to approximately 30%, and possibly more in certain cases, on 95° F. days also by employing the first embodiment of the present invention. Thus, in some embodiments, the electric power output enhancement is in the range of about 5% to about 30%, while in other embodiments the enhancement may be in the range of about 10% to about 30% on 95° F. days. The range of electric power output enhancement by utilization of any embodiment of the present invention is susceptible to considerable variation within the spirit and scope of the appended claims. Also, in addition to providing electric power output enhancement, by employing this turbine inlet air cooling technology, a gas turbine is able to produce output power at a constant rate, as typical output power rates are dependent on the ambient temperature surrounding the gas turbine. Employing the turbine inlet air cooling technology of this invention moderates the changes in temperature of the inlet air and thus provides a more constant output power rate.

Also, if more electricity power is needed, the micro-gas turbine inlet temperature can further cool down to 42° F. and increase electric power output by approximately 10%. However, for micro-gas turbine applications, the inlet air should not be cooled below about 40° F. to avoid frosting that may result from the loss of static temperature when the air is accelerated into the compressor.

The operating performance of a micro-CCHP system involves complex interactions and tradeoffs between three systems: the recuperated Brayton cycle system, the absorption refrigeration system, and the heat recovery system. Also, the First and Second Laws of Thermodynamics, regarding energy analysis and entropy production, respectively, are applied in optimizing the efficiency of this combined system.

Figure 2:
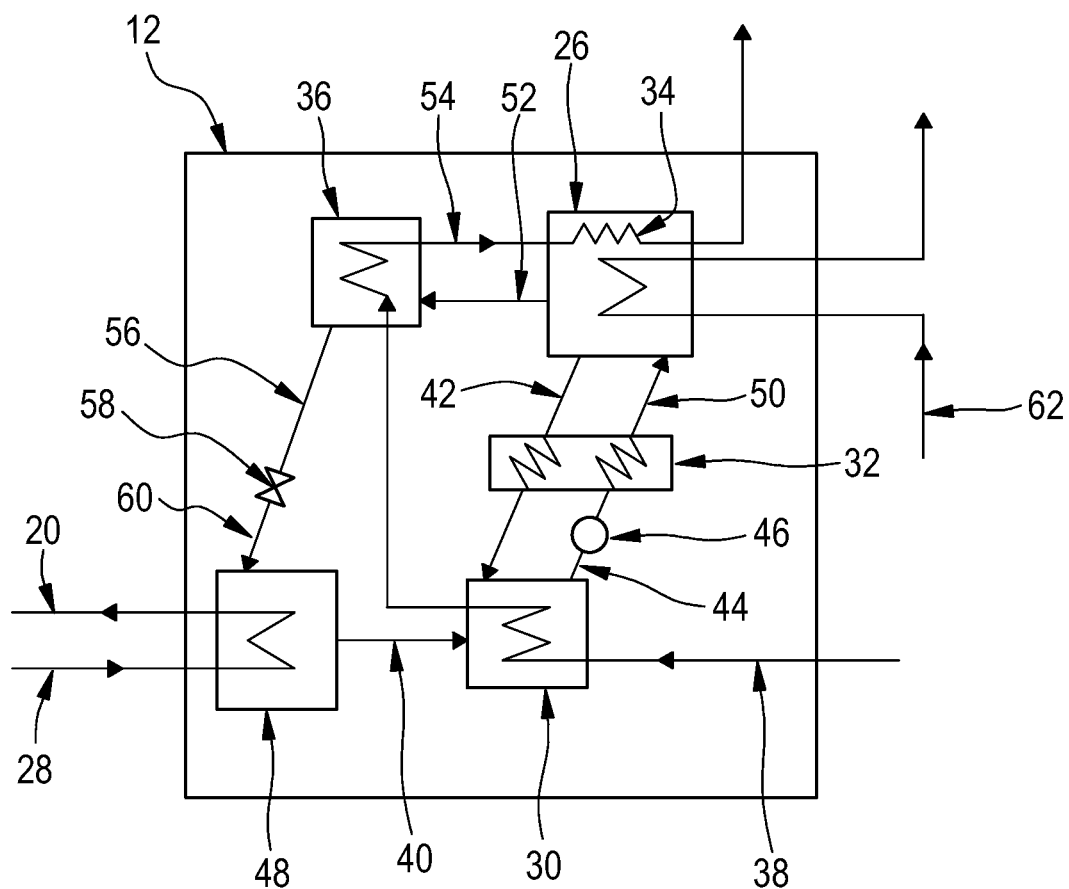
FIG. 2 is a diagram of a single-effect absorption chiller. In this embodiment, the heat recovery unit and the equivalent effect of cooling tower are embedded in the single-effect absorption chiller.

A second embodiment of this invention depicted in FIG. 2 eliminates the need for a stand-alone HRU and a cooling tower, which are necessary in known systems, by adding a heat exchanger to the generator of the single-effect absorption chiller and by utilizing a feed of water from a source as a cooling system in the absorber and in the condenser of the absorption chiller.

In known single-effect absorption chillers, the generator serves as a liquid-vapor separator and usually occupies a relatively large volume. However, in the second embodiment of the present invention, a heat exchanger component of the generator allows water to pass through the generator in a separate path and be heated by turbine exhaust gas, as shown in FIG. 2. This design can remove the current HRU used in known systems and take advantage of the generator's volume for heating water. This integration will significantly reduce the space, cost, and system irreversibility.

Also, by using the second embodiment of the present invention, as demonstrated in FIG. 2, the cooling tower employed with most single-effect absorption chillers in known systems can be removed by using a feed of water from a source through the absorber and then by redirecting the feed of water from the absorber to the condenser, so energy released from the condenser can be effectively utilized. In known commercial absorption chiller systems, cooling of the condenser is provided by water operated in a closed loop outside the absorption chiller system. In the new design, water from a source (such as tap, city, or well water) will be fed as the cooling water where it will (a) enter the absorber and absorb the heat released, (b) continue to enter the condenser and absorb the latent heat released by the condensing refrigerant, and (c) the feed of water (which has become warm at this stage) is routed through the heat exchanger component of the generator to be heated by hot exhaust gas. In this manner, the stand-alone cooling tower of the conventional absorption chiller can be removed. A third embodiment of this invention depicted in FIG. 3 eliminates the need for a stand-alone HRU and cooling tower, as are necessary in known systems, by adding a heat exchanger to the terminal generator of the multiple-effect absorption chiller and by utilizing a feed of water from a source as a cooling system in the absorber of the multiple-effect absorption chiller.

Figure 3:
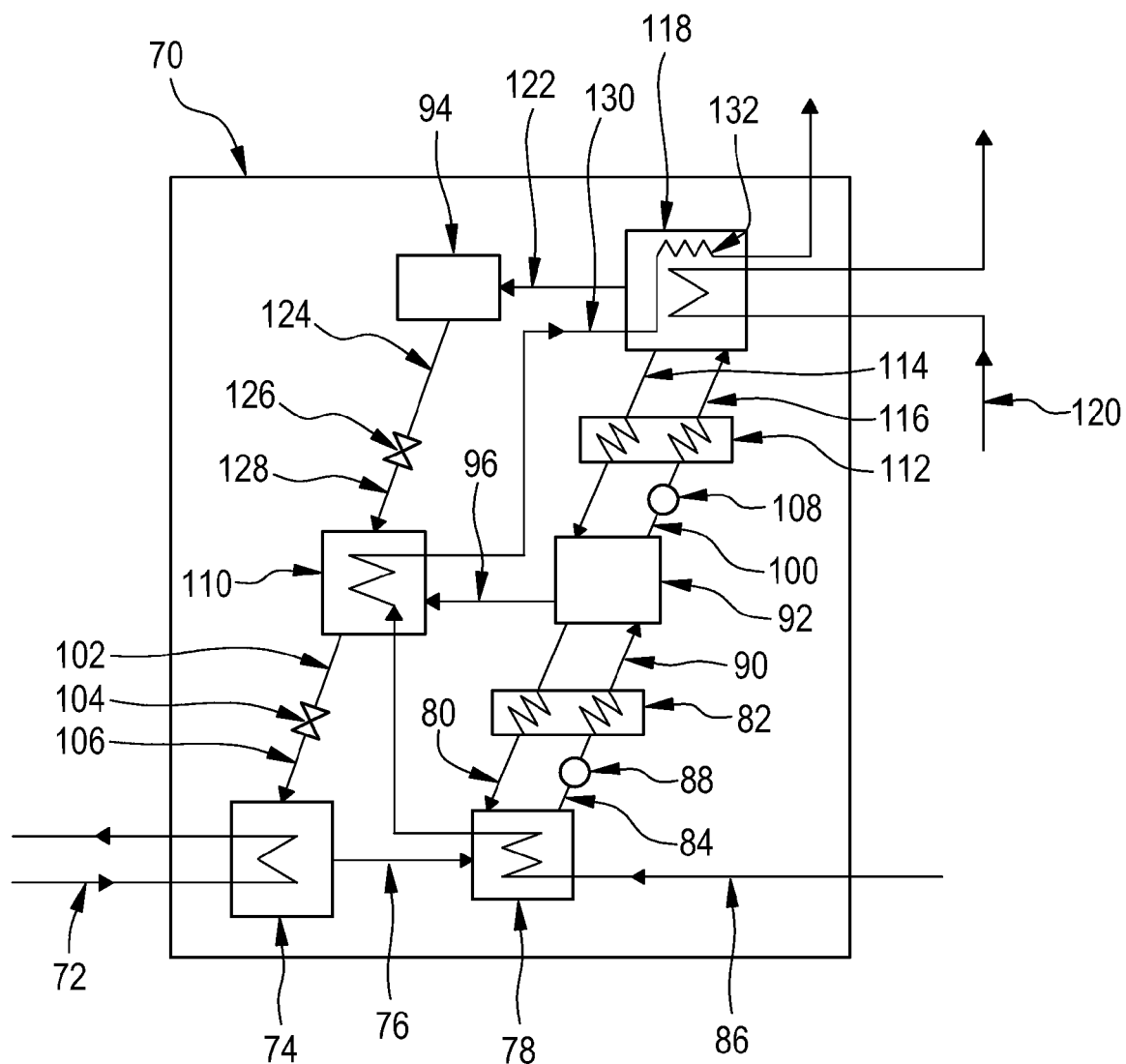
FIG. 3 is a diagram of a double-effect absorption chiller. In this embodiment, the heat recovery unit and the equivalent effect of cooling tower are embedded in the double-effect absorption chiller.

In known multiple-effect absorption chillers, the terminal generator serves as a liquid-vapor separator and usually occupies a relatively large volume. However, in the third embodiment of the present invention, a heat exchanger component of the terminal generator allows water to pass through the terminal generator in a separate path and be heated by turbine exhaust gas, as shown in FIG. 3. This design can remove the current HRU used in known systems and take advantage of the terminal generator's volume for heating water. This integration will significantly reduce the space, cost, and system irreversibility.

Also, by using the third embodiment of the present invention, as demonstrated in FIG. 3, the cooling tower employed with most multiple-effect absorption chillers in known systems can be removed by using a feed of water from a source through the absorber and then by redirecting the feed of water from the absorber to the initial condenser, so energy released from the initial condenser can be effectively utilized. In known commercial multiple-effect absorption chiller systems, cooling of the initial condenser is provided by water operated in a closed loop outside the absorption chiller system. In the new design, water from a source (such as tap, city, or well water) will be fed as the cooling water where it will (a) enter the absorber and absorb the heat released, (b) continue to enter the initial condenser and absorb the latent heat released by the condensing refrigerant, and (c) the feed of water (which has become warm at this stage) is routed through the heat exchanger component of the terminal generator to be heated by hot exhaust gas. In this manner, the stand-alone cooling tower of the conventional multiple-effect absorption chiller can be removed.

Turning now to the particulars of the figures, as noted above, FIG. 1 depicts one particular embodiment of the present invention. There it will be seen that the depicted combined cooling, heat, and power system comprises a combustion engine 10, an absorption chiller 12A, an engine inlet chiller 14, and a conduit for conveying chilled water 16 from the absorption chiller 12A to the engine inlet chiller 14, the foregoing being sized and configured so that, during use, waste heat released 24 from the combustion engine 10 powers a generator 26 of the absorption chiller 12A. The absorption chiller 12A produces chilled water 20 which provides, at least in part, space cooling 18, and the system is configured to circulate at least a portion of the chilled water 20 through the conduit 16 to the engine inlet chiller 14 to cool air 22 entering the combustion engine 10 and then to circulate at least of a portion of the water 28 from the engine inlet chiller 14 back to the absorption chiller 12A to repeat the cycle.

FIG. 2 depicts another particular embodiment of the present invention. There it will be seen that the depicted single-effect absorption chiller 12 comprises an absorber 30, a solution heat exchanger 32, a generator 26, a heat exchanger component 34 of the generator 26, condenser 36, a pump 46, an evaporator 48, and a throttling valve 58. The foregoing components are sized and configured so that, during use, a water stream 28 is provided to the evaporator 48 wherein a low-temperature, low-pressure refrigerant in the evaporator 48 flashes into vapor and absorbs heat from the water stream 28 thereby lowering the temperature of the water stream 28 and producing chilled water 20. The refrigerant vapor 40 is provided to an absorber 30 in which at least the refrigerant vapor 40 contacts an incoming condensed absorbent stream 42 from a solution heat exchanger 32, the refrigerant vapor 40 is absorbed by the condensed absorbent stream 42 to form a liquid diluted solution mixture 44, and feed of water from a water source 38 is provided to cool the absorber 30 to make a high affinity between the refrigerant vapor 40 and the condensed absorbent stream 42 during the absorption process. Using a pump 46, the liquid diluted solution mixture 44 is pumped to a sufficient pressure and to the solution heat exchanger 32 in which heat is transferred from the condensed absorbent stream 42 to the liquid diluted solution mixture 44 creating a preheated liquid diluted solution mixture 50. The preheated liquid diluted solution mixture 50 is provided to the generator 26. The preheated liquid diluted solution mixture 50 is heated in the generator 26 to a sufficient temperature using heat from an external heat source 62 so as to re-vaporize at least a portion of the refrigerant in the preheated liquid diluted solution mixture 50, thereby separating the preheated liquid diluted solution mixture into a superheated refrigerant vapor 52 and a condensed absorbent stream 42. The superheated refrigerant vapor 52 is provided to a condenser 36 in which it is maintained at substantially the same pressure as in the generator 26, and the superheated refrigerant vapor 52 is converted back to a saturated liquid phase in the condenser 36 so as to form condensed refrigerant 56 and release latent heat. The feed of water 38 is provided from the absorber 30 to the condenser 36 so that the feed of water 38 absorbs at least a portion of the released latent heat from the condensed refrigerant, thereby forming a condenser-heated water stream 54 and cooling the condenser 36 and further heating the condenser-heated water stream 54 by feeding it into the generator 26 through a heat exchanger component 34 of the generator 26, wherein the condenser-heated water stream 54 absorbs additional heat from energy remaining from the external heat source 62. The condensed refrigerant 56 is fed through a throttling valve 58, wherein the pressure of the condensed refrigerant 56 is reduced so as to flash the condensed refrigerant 56 thereby forming a flashed refrigerant vapor 60. At least a portion of the flashed refrigerant vapor 60 is then recycled back to the evaporator, and at least a portion of the condensed absorbent stream 42 is recycled back to the solution heat exchanger 32.

FIG. 3 is a diagram of another particular embodiment of the present invention. There it will be seen that the depicted double-effect absorption chiller 70 comprises evaporator 74, an absorber 78, an initial solution heat exchanger 82, an initial pump 88, an initial generator 92, an initial condenser 110, an initial throttling valve 104, a terminal pump 108, a terminal solution heat exchanger 112, a terminal generator 118, a heat exchanger component 132 of the terminal generator 118, a terminal condenser 94, and a terminal throttling valve 126. The foregoing components are sized and configured so that, during use, a first water stream 72 is provided to an evaporator 74 containing a refrigerant which absorbs heat from the first water stream 72 thereby forming a heated refrigerant 72 and lowering the temperature of the first water stream 72. The heated refrigerant 72 is provided to an absorber 78 in which the heated refrigerant 76 directly contacts an incoming condensed absorbent stream 80 from an initial solution heat exchanger 82, the heated refrigerant 76 is absorbed by the condensed absorbent stream 80 to form an liquid diluted solution mixture 84, and a second water stream 86 is provided to cool the absorber 78 to make a high affinity between the refrigerant vapor 76 and the condensed absorbent stream 80 during the absorption process. The liquid diluted solution mixture 84 is pumped using an initial pump 88 to a sufficient pressure and to an initial solution heat exchanger 82 in which heat is transferred from the condensed absorbent stream 80 to the liquid diluted solution mixture 84 creating a preheated liquid diluted solution mixture 90. The preheated liquid diluted solution mixture 90 is fed to an initial generator 92, and the preheated liquid diluted solution mixture 90 is heated in the initial generator 92 to a sufficient temperature using heat from latent heat released from a terminal condenser 94 so as to re-vaporize at least a portion of the refrigerant in the preheated liquid diluted solution mixture 90 thereby at least partially separating the preheated liquid diluted solution mixture into a superheated refrigerant vapor 96, a condensed absorbent stream 80, and a residual preheated liquid diluted solution mixture 100. The superheated refrigerant vapor 96 is provided to an initial condenser 110 which is maintained at substantially the same pressure as in the initial generator 92, and the superheated refrigerant vapor 96 is converted back to a saturated liquid phase in the initial condenser 110 so as to form condensed refrigerant 102 and release latent heat. The pressure of the condensed refrigerant 102 is reduced by using the initial throttling valve 104, so as to flash the condensed refrigerant 102 by reducing its pressure and temperature, thereby forming a flashed refrigerant vapor 106. The flashed refrigerant vapor 106 is provided to the evaporator 74. The residual preheated liquid diluted solution mixture 100 is pumped to a sufficient pressure using a terminal pump 108 and to a terminal solution heat exchanger 112, so that heat is transferred from the condensed absorbent stream 114 to the residual preheated liquid diluted solution mixture 100 creating a preheated liquid diluted solution mixture 116, and the preheated liquid diluted solution mixture 116 is fed to a terminal generator 118. The second water stream 86 is provided from the absorber 78 to the initial condenser 110 so that the second water stream 86 absorbs at least a portion of the released latent heat from the condensed refrigerant 102. The residual preheated liquid diluted solution mixture 116 is heated in a terminal generator 118 to a sufficient temperature using the heat from an external heat source 120, so as to re-vaporize at least a portion of the refrigerant in the preheated liquid diluted solution mixture 116, thereby separating the preheated liquid diluted solution mixture 116 into a superheated refrigerant vapor 122 and a condensed absorbent stream 114. The superheated refrigerant vapor 122 is provided to the terminal condenser 94 in which it is maintained at substantially the same pressure as in the terminal generator 118. The superheated refrigerant vapor 122 is converted back to a liquid phase in the terminal condenser 94, so as to form a condensed refrigerant 124 and release latent heat. Using a terminal throttling valve 126, the condensed refrigerant 124 is flashed by reducing its pressure and temperature, thereby forming a flashed refrigerant vapor 128. The flashed refrigerant vapor 128 is provided to the initial condenser 110, and the flashed refrigerant vapor 128 is converted back to a saturated liquid phase in the initial condenser 110, thereby forming condensed refrigerant 102 and releasing latent heat. Using an initial throttling valve, the condensed refrigerant 102 is flashed by reducing its pressure and temperature, thereby forming a flashed refrigerant vapor 106. At least a portion of the flashed refrigerant vapor 106 is recycled back to the evaporator 74, and at least a portion of the condensed absorbent stream 80 is recycled back to the evaporator 78. Finally, the second water stream 86 is further heated by feeding it into the terminal generator 118 through a compact heat exchanger component 132 of the terminal generator 118 and heating the second water stream 86 using energy remaining from the external heat source 120.

The core of a CCHP system comprises any power-generating device including gas turbines, reciprocating engines (spark ignition, diesel, and sterling engines), wind turbines, fuel cells, solar panels, and mini-hydro. Currently, reciprocating engines, particularly gas and diesel, dominate the residential and small business markets. In the present invention, the use of combustion engines, such as reciprocating engines and gas turbines, is most preferred.

For micro-CCHP, a system employing a micro-gas turbine with a double-effect absorption chiller is most preferred. Since the exhaust gas from a micro-gas turbine is around 275° C., higher than those of reciprocating engines, the embodiment employing a double-effect absorption chiller takes advantage of a micro-gas turbine's higher exhaust gas temperature. Both the chilled water and hot water will increase when a double-effect absorption chiller is employed. The tradeoff to use a double-effect chiller is its bigger size and complexity.

As noted supra, the overall thermal/electric efficiency of existing micro-CCHP systems are generally below 70% and hover at 65% due to the small sizes of each component and the additional irreversibility generated between individual commercial units. In one embodiment of this invention, as depicted in FIG. 1, a combined cooling, heat, and power system comprises a combustion engine 10, an absorption chiller 12A, an engine inlet chiller 14, and a conduit for conveying chilled water 16 from the absorption chiller 12A to the engine inlet chiller 14. A typical heat recovery unit of a micro-CCHP system is integrated into a generator of the absorption chiller (single-effect absorption chiller 12 in FIG. 2; double-effect absorption chiller 70 in FIG. 3) of the present invention to eliminate the stand-alone heat recovery system, as well as eliminate the need for a cooling tower (or an equivalent cooling heat exchanger) by incorporating a condenser cooling system with the cooling water coming from an outside source (38 in FIG. 2; 86 in FIG. 3) to the absorber (30 in FIG. 2; 78 in FIG. 3) of the absorption chiller (12 in FIG. 2; 70 in FIG. 3). By integrating these components into a compact module and eliminating the stand-alone heat recovery system and cooling tower, this invention provides an integrated micro-CCHP utilizing a micro-gas turbine that is a high-efficiency system with excellent performance. By using this embodiment of the present invention (12A in FIG. 1) in the realm of micro-CCHP technology, i.e., less than 200 kW, the micro-CCHP performance can be up to approximately 142.5%, and possibly more in certain cases, when a single-effect absorption chiller (12 in FIG. 2) is used as the absorption chiller 12A in the embodiment depicted in FIG. 1, and up to approximately 164.8%, and possibly more in certain cases, when a double-effect absorption chiller (70 in FIG. 3) is used as the absorption chiller 12A in the embodiment depicted in FIG. 1. It is noted that the overall performance of higher than 100% does not violate the Second Law of Thermodynamics. The part of energy beyond 100% does not come from the fuel, but it is harvested from the environment via the absorption chiller 12A.

When the single-effect absorption chiller (12 in FIG. 2) is employed as the absorption chiller 12A in FIG. 1, the micro-CCHP performance can be up to approximately 142.5%, and possibly more in certain cases, which includes 30% for electricity, 31.5% for chilled water, and 81% for hot water. Specifically, for this embodiment of the present invention in FIG. 1, if 360,000 kJ/h of fuel is used in a micro-gas turbine 10, there would result 29.6 kW of power produced (a performance of approximately 30% for electricity produced) with a radiation loss of approximately 6,000 kJ/h and approximately 242,000 kJ/h of waste heat released 24 from the combustion engine 10 to the absorption chiller 12A. Then, the single-effect absorption chiller 12 with embedded heat recovery unit receives 242,000 kJ/h from the micro-gas turbine 10 and 117,000 kJ/h from the return water stream 28, and assuming a typical thermal coefficient of performance of 0.68 for the single effect absorption chiller, outputs 289,000 kJ/h in hot water at 68 degrees C., 22,000 kJ/h to loss, and 48,000 kJ/h to exhaust. Therefore, the resulting performance of the single-effect absorption chiller 12 with embedded heat recovery unit is approximately 81% for hot water produced. Also, there is 117,000 kJ/h, or 31.5% performance, for chilled water 20 produced by the single-effect absorption chiller 12. Therefore, as can be seen from the above figures, for every 100 kW of fuel input into the micro-gas turbine, up to approximately 142.5 kW performance is achieved. Again, it is noted that the overall performance of higher than 100% does not violate the Second Law of Thermodynamics. The part of energy beyond 100% does not come from the fuel, but it is harvested from the environment via the absorption chiller 12A. The cooling capacity, 31.5 kW from the chilled water, is counted twice— first as the cooling performance and later recovered by the hot water.

When the double-effect absorption chiller (70 in FIG. 4) is employed as the absorption chiller 12A in FIG. 1, the micro-CCHP performance can be up to approximately 164.8%, and possibly more in certain cases, which includes 30% for electricity, 43.3% for chilled water, and 91.4% for hot water. Specifically, for this embodiment of the present invention in FIG. 1, if 360,000 kJ/h of fuel is used in a micro-gas turbine 10, there would result 29.6 kW of power produced (a performance of approximately 30% for electricity produced) with a radiation loss of approximately 6,000 kJ/h and approximately 242,000 kJ/h of waste heat released 24 from the combustion engine 10 to the absorption chiller 12A. Then, the double-effect absorption chiller 70 with embedded heat recovery unit receives 242,000 kJ/h from the micro-gas turbine 10 and 156,000 kJ/h from the return water stream 72, and assuming a typical thermal coefficient of performance of 1.3 for the double-effect absorption chiller 70, outputs 328,000 kJ/h in hot water at 68 degrees C., 22,000 kJ/h to loss, and 48,000 kJ/h to exhaust. Therefore, the resulting performance of the double-effect absorption chiller 70 with embedded heat recovery unit is approximately 91.4% for hot water produced. Also, there is 156,000 kJ/h, or 43.3% performance, for chilled water produced by the double-effect absorption chiller 70. Therefore, as can be seen from the above figures, for every 100 kW of fuel input into the micro-gas turbine, up to approximately 164.8% performance is achieved. Again, it is noted that the overall performance of higher than 100% does not violate the Second Law of Thermodynamics. The part of energy beyond 100% does not come from the fuel, but it is harvested from the environment via the absorption chiller 70.

Known micro-CHP systems only convert waste heat to hot water, and consequently, only the fuel cost of the hot water is saved. Conversely, using the above embodiments of the present invention, a resulting micro-CCHP system can provide an overall performance of up to approximately 142.5%, and possibly more in certain cases, when a single-effect absorption chiller (12 in FIG. 2) is used as the absorption chiller 12A in the embodiment depicted in FIG. 1, and up to approximately 164.8%, and possibly more in certain cases, when a double-effect absorption chiller (70 in FIG. 3) is used as the absorption chiller 12A in the embodiment depicted in FIG. 1. The capability to produce more electricity and chilled water is more important than producing hot water, especially in rural areas in underdeveloped countries because villagers can generate hot water using traditional biomass such as wood and agriculture residue. Also, it is noted that even though the foregoing discussion was limited to the realm of micro-CCHP systems, there is a similar enhancement in larger systems employing embodiments of this invention as well, such as 1 MW, 50 MW, 250 MW, etc.

In all of the embodiments of the present invention, the single-effect or multiple-effect absorption chiller employed may use any combination of refrigerant/absorbent solutions. Preferred refrigerant/absorbent solutions are water/lithium bromide and ammonia/water, with water/lithium bromide solution being most preferred.

It should be appreciated that, while specific embodiments are described above, several other variants of those embodiments may be contemplated by those of ordinary skill in the art in view of this disclosure, those variants nevertheless falling within the spirit and scope of the present invention. Accordingly, the scope of this invention is not limited to the specific embodiments described in detail above.

I claim:

1. A single-effect absorption chiller, comprising:
an absorber operatively connected to a solution heat exchanger and a generator, and
a condenser in fluid communication with the absorber, wherein the absorber is sized and configured to receive a feed of water from a source of water, and to transfer heat to the feed of water and then to convey the feed of water to the condenser without further heat conditioning of the feed of water prior to its entry into the condenser, and wherein the condenser is sized and configured to receive the feed of water from the absorber and to transfer heat to the feed of water, thereby cooling the condenser and
further comprising a heat exchanger component of the generator, wherein the heat exchanger component of the generator is sized and configured to receive the feed of water from the condenser and to transfer heat to the feed of water from an external heat source.

2. A single-effect absorption chiller, comprising:
an absorber operatively connected to a solution heat exchanger and a generator, and
a condenser operatively connected to a heat exchanger component of the generator,
wherein the condenser is sized and configured to receive a feed of water from a source of water and to transfer heat to the feed of water and then to convey the feed of water to the heat exchanger component of the generator, which heat exchanger component transfers heat to the feed of water from an external heat source.

3. A system comprising: a combustion engine, a single-effect absorption chiller according to claim 2, an engine inlet chiller operatively connected to at least the combustion engine, and a conduit for conveying chilled water from the absorption chiller to the engine inlet chiller, the foregoing being sized and configured so that, during use, waste heat released from the combustion engine powers the generator of the single-effect absorption chiller, which single-effect absorption chiller produces chilled water, and the system being sized and configured to circulate at least a portion of the chilled water through the conduit to the engine inlet chiller to cool air entering the combustion engine.

4. A system comprising: a combustion engine, an absorption chiller according to claim 2, an engine inlet chiller operatively connected to at least the combustion engine, and a conduit for conveying chilled water from the absorption chiller to the engine inlet chiller, the foregoing being sized and configured so that, during use, waste heat released from the combustion engine powers an internal generator of the absorption chiller, which absorption chiller produces chilled water, and the system being sized and configured to circulate at least a portion of the chilled water through the conduit to the engine inlet chiller to cool air entering the combustion engine.

5. A method comprising:
a. providing a refrigerant vapor to an absorber of a single-effect absorption chiller in which at least
i. the refrigerant vapor contacts an incoming condensed absorbent stream from a solution heat exchanger,
ii. the refrigerant vapor is absorbed by the condensed absorbent stream to form a liquid diluted solution mixture, and
iii. a water stream from a source of water is provided to cool the absorber to make a high affinity between the refrigerant vapor and the condensed absorbent stream during the absorption process in (a)(ii) and to transfer heat to the feed of water;
b. providing the water stream from the absorber to a condenser so that the water stream absorbs at least a portion of released latent heat from the condenser, thereby forming a condenser-heated water stream and cooling the condenser; and
c. further heating the condenser-heated water stream by feeding it into a generator through a heat exchanger component wherein the condenser-heated water stream absorbs additional heat from energy from an external heat source.

6. The method of claim 5 further comprising:
d. providing a second water stream into an evaporator in which a low-temperature, low-pressure refrigerant flashes into vapor and absorbs heat from the second water stream, thereby lowering the temperature of the second water stream and forming a chilled water stream.

7. The method of claim 6 further comprising:
e. transferring at least a portion of the chilled water stream to an engine inlet chiller operatively connected to a combustion engine, and
f. circulating exterior air through the engine inlet chiller.

8. A method comprising:
a. providing a refrigerant vapor to an absorber of either a single-effect or a multi-effective absorption chiller in which at least
  i. the refrigerant vapor contacts an incoming condensed absorbent stream from a solution heat exchanger,
  ii. the refrigerant vapor is absorbed by the condensed absorbent stream to form a liquid diluted solution mixture, and
  iii. a water stream from a source of water is provided to cool the absorber to make a high affinity between the refrigerant vapor and the condensed absorbent stream during the absorption process in (a)(ii) and to transfer heat to the feed of water;
b. providing the water stream from the absorber to a condenser so that the water stream absorbs at least a portion of released latent heat from the condenser, thereby forming a condenser-heated water stream and cooling the condenser; and
c. further heating the condenser-heated water stream by feeding it into a generator through a heat exchanger component wherein the condenser-heated water stream absorbs additional heat from energy from an external heat source.

* * * * *